Robert J. Dodge
Ernest R. Tindle
INVENTORS.

BY Browning, Hyer,
Eckenroht + Thompson
ATTORNEYS

Robert J. Dodge
Ernest R. Tindle
INVENTORS.

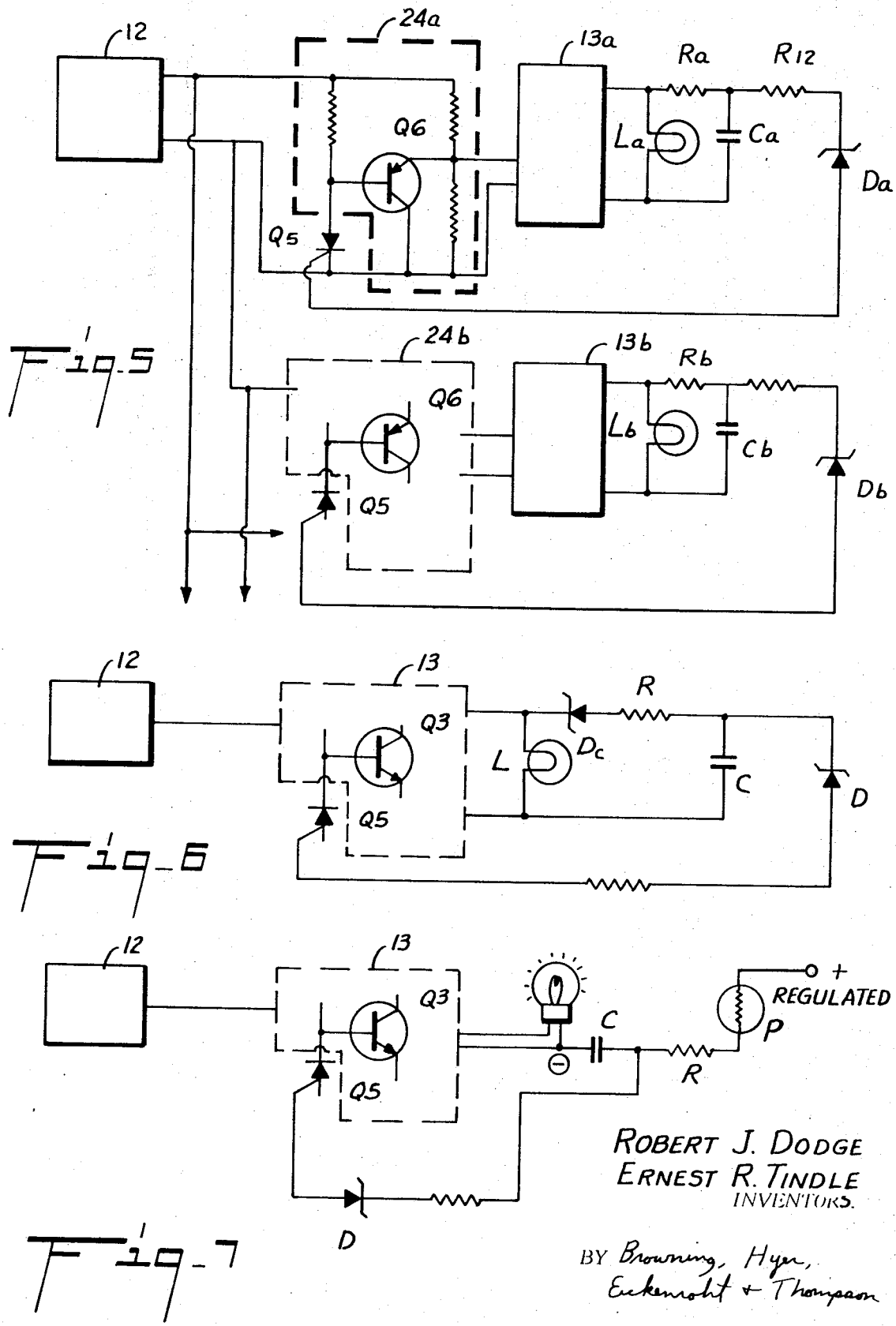

United States Patent Office 3,541,388
Patented Nov. 17, 1970

3,541,388
ENERGY CONTROL FOR FLASHING
VISUAL SIGNALS
Robert J. Dodge and Ernest R. Tindle, Houston, Tex., assignors to Automatic Power, Inc., Houston, Tex., a corporation of Delaware
Filed Feb. 12, 1968, Ser. No. 704,939
Int. Cl. H05b 37/00
U.S. Cl. 315—238                            17 Claims

ABSTRACT OF THE DISCLOSURE

An energy control is disclosed for maintaining the time-intensity function from a flashing light source, such as a lamp, at a substantially constant effective value. The control includes a multivibrator timer having output signals of predetermined duration corresponding to lamp-on and lamp-off periods, and these output signals control a transistor driver which drives the lamp to turn it on and off. In one form of the invention, a series resistance-capacitance circuit is connected across the lamp and a Zener diode of a predetermined breakdown voltage is connected to the capacitor. When operating voltage is applied to the lamp the capacitor charges according to the R–C time constant to the Zener breakdown voltage. The Zener is connected to the gate electrode of an SCR which is, in turn, connected through its power electrodes across the input to the transistor driver. The SCR conducts to clamp the driver and the lamp off in response to the breakdown of the Zener diode. In another form of the invention, a photoresistive device is used to generate a voltage in response to light emitted from the lamp and this voltage is used to charge the capacitor.

---

This invention relates to an energy control for controlling the energy supplied from a source of electric current to flash a light source, such as a lamp, and in one of its aspects to such a control capable of maintaining the time-intensity function of a flashing lamp at a substantially constant effective value despite varying operating voltage across the lamp.

Flashing lamps are used extensively as marine and air navigation aids for marking the presence of obstructions, such as offshore platforms, and for guiding marine navigators and aviators. Commercial or generated power is generally not available at many remote sites where such aids are installed and these lamps are usually operated from a battery. However, battery energy is an expensive commodity when compared to commercial power, so that its utilization must be very efficient. Also, where commercial or generated power is not available, the batteries used cannot be constantly recharged for an indefinite period of time and the amount of energy available from a given battery thus decreases as the battery is used to the point where the batteries must be replaced or recharged. Thus, small savings in the energy consumed from the batteries each time a lamp is flashed can result in a considerable extension of the life of the batteries and corresponding savings in the cost of battery energy.

Also, it is necessary that many marked obstructions be left unmanned and unattended for long periods of time so that highly reliable and low-power consumption components should be employed to control the operation of the lamps.

Heretofore, it has been necessary to provide a light source of substantially higher output at the beginning and throughout a great part of battery life, to insure sufficient light output at the reduced voltage associated with the end of battery life. Constant output can be achieved by regulating the voltage from the battery; however, such systems inherently dissipate a certain proportion of the useful battery energy as heat and, therefore, waste battery power. Generally, the light source is flashed on and off for predetermined fixed periods of time irrespective of the condition of the battery.

Federal regulations require that lights used for warning signals meet certain minimum standards, and the optical effectiveness of such lights is generally described in terms of an effective intensity of illumination rather than the absolute intensity or brightness of the lamp or the lamp-lens combination used.

The effective intensity of a flashing light is ideally the intensity of a fixed light at or near visual threshold, which has the same effect on the eye as does the flashing light.

The human eye at or near visual threshold responds to a flashing light by summing the energy of the time-intensity function so that the effective intensity of a short flash is constant at threshold as long as the integrated light-time function is constant. The effective intensity ($I_{eff}$) is thus defined by the time-intensity function in the general case according to the following formula:

$$I_{eff} = \int_{t_1}^{t_2} \frac{I(t)\,dt}{a+(t_2-t_1)} \tag{1}$$

where $I(t)$ is the instantaneous intensity as a function of time
$t_1$ and $t_2$ are limits of integration (time) chosen to provide optimum effective intensity
$a$ is a psychophysical constant (generally from .1 to .3)

For practical application to flashing incandescent lamps generally used as warning lights, Formula 1 may be written as:

$$I_{eff} = \frac{It_f}{a+t_f} \tag{2}$$

where $t_f$ is flash duration (on-time less the time to reach 90% of incandescence)
$I$ is the peak intensity of the lens-lamp combination Thus, effective intensity is a function of the peak intensity and the duration of the flash so that, within reasonable limits, ($I_{eff}$) of Formula 2 will be maintained constant at different lamp intensities by maintaining the proper flash length. The intensity is, in turn, a function of the value of the voltage applied to the lamp and the particular lamp-lens combination employed. The lamp-lens combination remains fixed in most applications; however, the voltage applied to the lamp and, thus, the lamp intensity, is generally decreasing so that in the usual case it will be necessary to provide an increasing flash length with time to maintain the required effective intensity.

It is, thus, an object of this invention to provide an energy control for flashing a lamp wherein the energy supplied to operate the lamp is utilized more effectively than previously done.

Another object is to provide such a control which is more suitable for operating a flashing lamp unattended for relatively longer periods of time than previous controls.

Another object of this invention is to provide such a control wherein substantially no more than that energy needed to provide the required effective intensity is used.

Another object is to provide such a control wherein only a minimum amount of energy is consumed in controlling the lamp flash cycle, and the lamp consumes only that amount of energy needed for the required time-intensity function during each flash cycle.

Another object of this invention is to provide such a control wherein the flash length is automatically varied to provide a constant effective intensity even though the applied potential to the lamp is increasing or decreasing.

Also, when Formulas (1) or (2) are satisfied, the flash length will bear a known relationship to battery voltage, and it is, thus, another object of this invention to provide such a control wherein measurement of the flash length, which may be made within the visual range of the light, provides a measurement of battery condition without the necessity of actually going to the battery location and measuring the battery voltage.

These and other objects, advantages, and features of the invention, which will be apparent from a consideration of the specification, claims and appended drawings, are accomplished by measuring the energy utilized in operating a flashing light during each flash cycle and generating a cut-off signal to shut off the light source during each cycle when the energy measured is substantially that required to cause light at the required time intensity function value to be emitted. According to the preferred embodiment of this invention, this is accomplished by charging a capacitor in a resistance-capacitance circuit of suitable time-constant with the applied voltage across the lamp, or a part thereof, to a predetermined lower potential. This lower potential is selected during each flash cycle so that the time it takes to charge the capacitor to this potential corresponds substantially to the lamp-on time required to maintain a required effective intensity, according to the Formula (1). Thus, when the predetermined lower potential on the capacitor is reached, the lamp may be disconnected from its operating potential and Formula (1) will be satisfied at any applied voltage to the lamp, and the energy utilized will be substantially only that required to give the required effective intensity.

In the drawings, wherein like reference numerals are used to designate like parts throughout:

FIG. 5 is a partial block and schematic diagram illustrating a modification of the circuit whereby a single timer may be used to control a plurality of lamp drivers embodying the invention;

FIG. 6 is a partial block and schematic diagram illustrating a modification of the preferred form of this invention; and FIG. 7 is a partial block and schematic diagram of a less preferred form of the invention.

Figure 1:
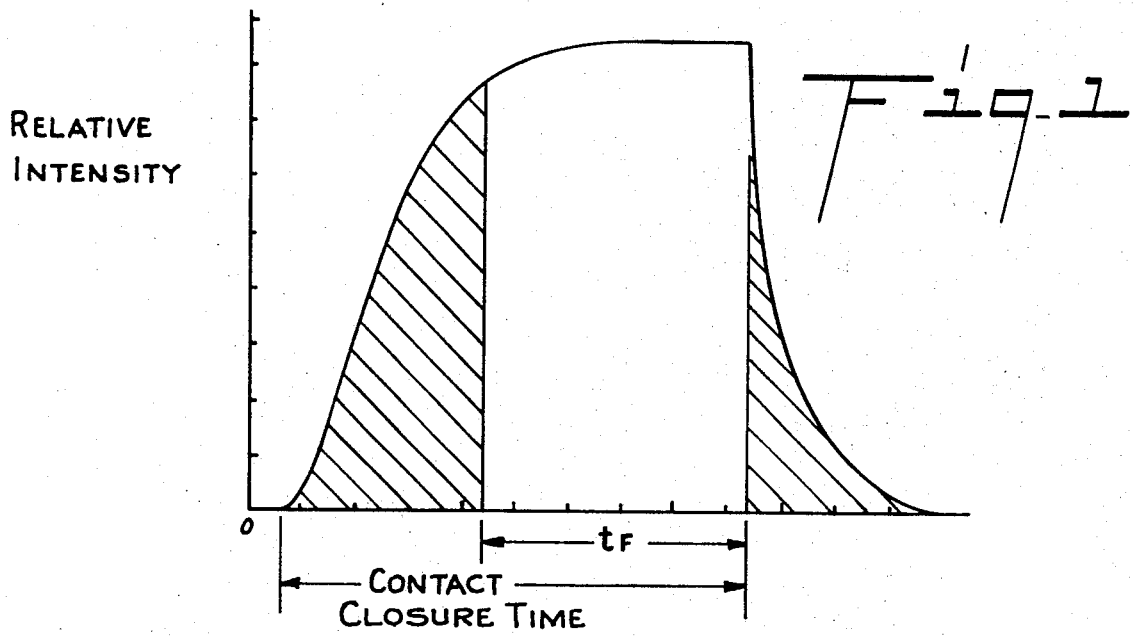
FIG. 1 is a curve of the time-intensity function of a flashed incandescent lamp.

In FIG. 1 the shaded area is lamp incandescence and nigrescence time and the remaining area under the curve represents the effective portion of the time-intensity function curve.

Figure 2:
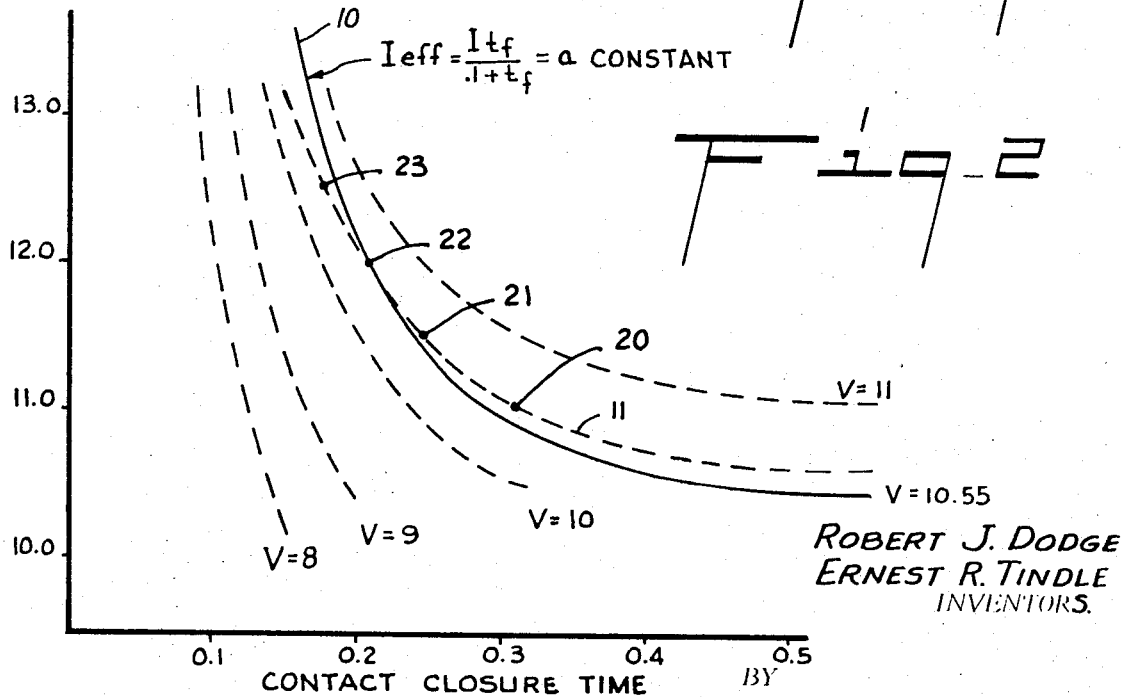
FIG. 2 is a graph showing the curve of Formula (2) and corresponding charge-curve of a capacitor in an R-C circuit to a predetermined level at various applied voltages and times of charge.

In FIG. 2 the solid line 10 is a plot of Formula (1) with $I_{eff}$=120 foot candles, the applied voltage to the lamp being from 10.0 to 13.0 volts and the time that voltage is applied to the lamp (contact closure time) being between 0.1 and 0.5 second. The lamp-lens combination is such that the intensity of the light with the particular lamp used is 250 candle power at 12.0 volts and .77 amp of current to the lamp. The lamp incandescence time for the lamp used was found to be .11 second and this time must be subtracted from the contact closure time to arrive at the duration for the flush ($t_f$).

It has also been found that solid line curve 10 closely approximates a curve representing the time it takes to charge a capacitor of appropriate value in a resistance-capacitance (R-C) circuit to a certain voltage, when the range of applied voltages to the lamp are used to charge the capacitor. For example, the dotted line curve 11 in FIG. 2 is a plot of a capacitor in a resistance-capacitance circuit being charged with from slightly less than 11.0 volts to slightly greater than 13.0 volts over a period of time sufficient for the charge on the capacitor to reach 10.55 volts. The remaining dotted line curves in FIG. 1 show the same sort of plot except that the capacitor is charged to different voltage levels, as noted.

Thus, with the proper R-C time constant and the properly selected maximum charge level, the curve 11 can be matched to curve 10, and the time it takes to charge the capacitor to a particular given voltage with lamp-applied voltage can be substituted in Formula (2) to satisfy this formula for a required effective intensity. During each flash cycle, when the voltage on the capacitor reaches the value representing the required charging time, the lamp can then be switched off since the required effective intensity has been achieved.

Figure 3:
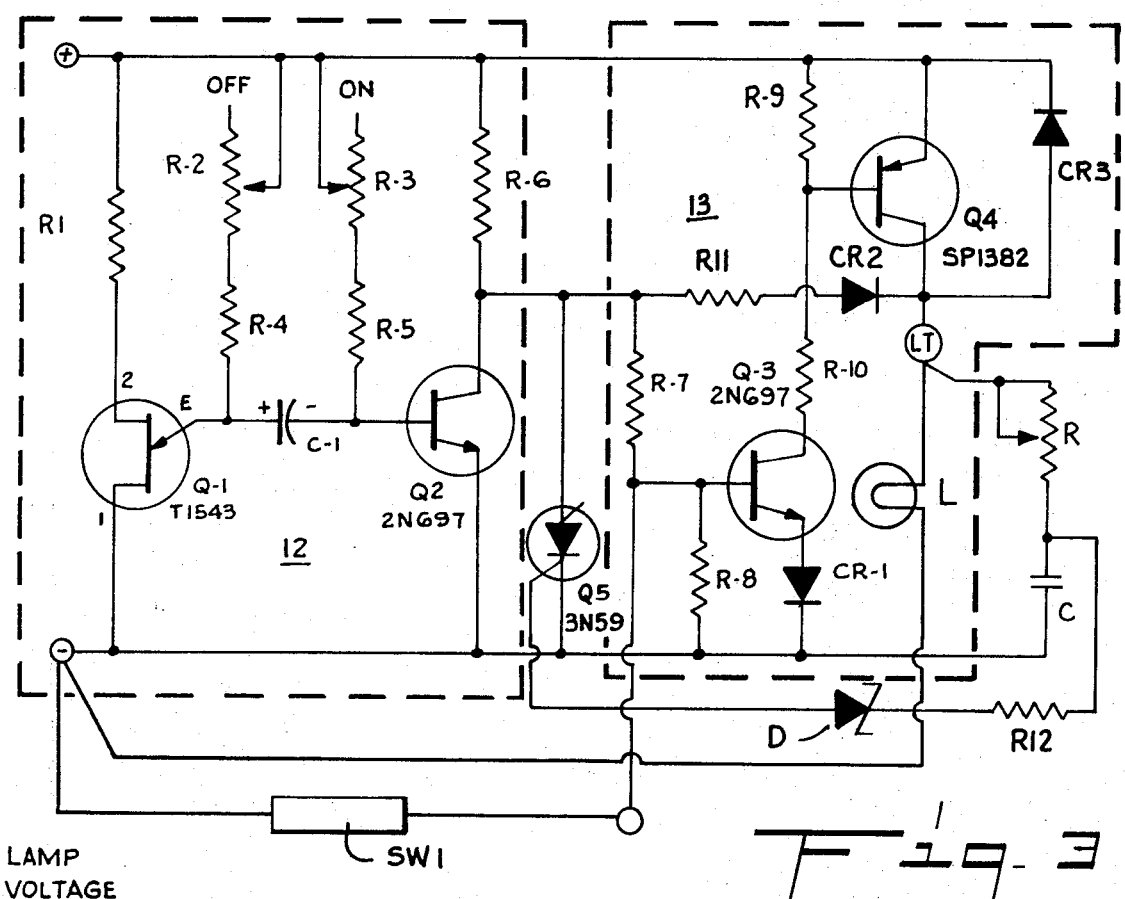
FIG. 3 is a schematic diagram of a preferred energy control circuit embodying the invention.

Referring to FIG. 3, in the preferred embodiment of this invention unijunction transistor $Q_1$ and transistor $Q_2$ form a multivibrator timer 12 producing start and stop pulses in a predetermined on-off cycle for controlling the flash cycle of an incandescent lamp L. Multivibrator 12 is of conventional design and its operation is fully described in the General Electric Transistor Manual (7th edition, 1954), chapter 13. Multivibrator 12 and associated circuitry to be described are connected to a source of direct current such as a battery (not shown).

According to the customary practice in the aids to navigation industry the lamp is flashed on for 0.3 second and off for 0.7 second at a rate of 60 flashes per minute, and this time sequence can be set by the proper selection of the values of the components R–1 to R–5 and C–1 in timer 12. However, when apparatus embodying the present invention is used with timer 12, it is preferred that the on-time be set at higher value, such as 0.7 second and that the off time be set at a corresponding lower value, such as 0.3 second because, during normal operation, timer 12 will control only the start of each flash cycle and lamp L will be turned off automatically by other control means to be described. The timing cycle of timer 12, however, represents the maximum on and minimum off times available to flash the lamp in the event that other control means become inoperative.

The output of timer 12, at the collector of $Q_2$, is connected to a transistor driver circuit 13 which includes transistors $Q_3$ and $Q_4$ and this circuit functions as switching means for connecting lamp L to and from a source of direct current to control the conduction of current through lamp L. The collector of transistor $Q_2$ and the base of transistor $Q_3$ are each connected in a voltage divider string which includes resistors R–6, R–7 and R–8, the collector of $Q_2$ being connected at the junction of R–6 and R–7 and the base of $Q_3$ being connected at the junction of R–7 and R–8. When timer 12 is in the lamp-on cycle, the voltage at the collector of $Q_2$ and thus the base of $Q_3$, is high and $Q_3$ is caused to conduct, and when timer 12 is in its lamp-off period these voltages are low and $Q_3$ is cut off. The conduction of $Q_3$ is maintained at a proper level during the lamp-on period by diode CR–1 connected to its emitter. Thus, transistor $Q_2$ switches from nonconducting to conducting states, and vice versa, in response to start and stop pulses from timer 12, to provide the proper lamp-on and off periods.

The collector of $Q_3$ is connected through resistor $R_{10}$ to the base of $Q_4$, and through resistor R–9 to the D.C. source, and transistor $Q_4$ responds to the conduction of $Q_3$ during the lamp-on period to conduct current through lamp L which is connected between the collector of $Q_4$ and ground or the negative side of the direct current source.

Means are provided for measuring or sensing energy utilized in operating lamp L and generating a cut-off signal when this energy is such that the required effective intensity has been provided. This means preferably includes a resistance-capacitance circuit including resistor R and capacitor C which is connected across lamp L so that capacitor C is charged with lamp-applied voltage. It is preferred that R be variable so that resultant R-C constant can be easily varied to vary the shape of the charge curves of the circuit. A Zener diode D of suitable breakdown voltage is connected through resistor R–12 to the junction of R and C and the diode D is, in turn, connected to the gate electrode of an SCR $Q_5$ which functions as a coupling means. Thus, when Zener D breaks down in response to the charge on capacitor C reaching the Zener breakdown voltage, a voltage signal is conducted to SCR $Q_5$. This voltage signal which functions as a cut-off signal, causes $Q_5$ to switch to its low impedance state. The power electrodes of $Q_5$ are connected across the output of $Q_2$ so that an effective short is provided across this output when $Q_5$ is in its low impedance state, thus clamping $Q_3$ off and stopping conduction of energy to operate lamp L. $Q_5$ acts as a latch and remains in its low impedance state until the start of the next timing cycle, at which time $Q_5$ is caused to be switched back to its high impedance state.

A sun switch SW1 may be connected across the base of $Q_3$ to clamp it off during daylight hours.

Figure 4:
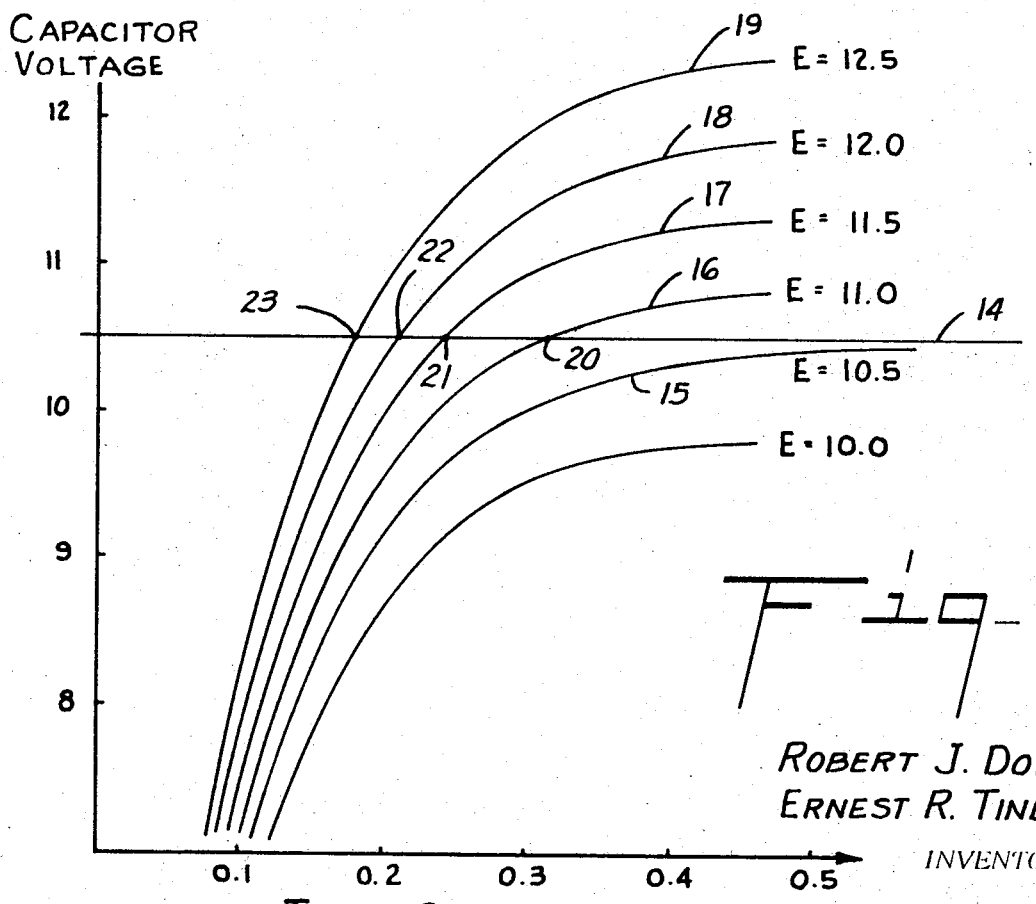
FIG. 4 is a graph of various charge curves of an R-C circuit where different lamp voltages E are applied to the R-C circuit.

It is preferred that Zener D be selected so that its breakdown voltage is at or just above the voltage where, with the lamp used, a steady burning light would be necessary to get the required intensity. For the particular 12.0 lamp L used to illustrate this invention, the minimum operating voltage is approximately 10.5 volts. Thus, a Zener value (V) of 10.55 volts is picked and line 14 in FIG. 4 is drawn at this point. Also, the maximum flash length can be picked at a point where the required effective intensity would be achieved at the minimum voltage; for example, 0.5 second. The R-C constant can then be chosen so that curve 15 in FIG. 4, which is the charge curve of the R-C circuit with the minimum voltage, becomes asymptotic with line 14 at or near 0.5 second. In the example shown, the R-C time constant is 0.1. Then curves 16–19 in FIG. 4, which plot the charge on capacitor C at progressively higher charging voltages (representing higher lamp potentials) will cross line 14 at progressively shorter times represented by points 20–23 on line 14. The points 20–23 are plotted in FIG. 2 and fall close to curve 10 and form points for curve 11.

In the embodiment illustrated, the timing multivibrator 12 provides start and stop pulses to control one driver circuit 13 and associated components to control one lamp L. However, as shown in FIG. 5, a single timer 12 may be used to control a plurality of driver stages 13a and 13b, with proper isolation between their inputs, to flash a plurality of lamps. This isolation is provided by circuits 24a and 24b, including transistor $Q_6$ and associated components connected between timer 12 and drivers 13a and 13b to insure that each driver and lamp is operated independently of the others. Also, each driver 13a and 13b includes appropriately-sized components Ra and Rb, Ca and Cb, and Da and Db so that the effective intensity of each lamp is maintained constant independently of the other lamps. Thus, the proper effective intensity of each lamp is assured even if the applied voltage to any one lamp is different than that applied to the other lamps due to voltage losses in the connecting wiring.

In order to more closely match curves 10 and 11, the circuit of FIG. 3 may be modified as shown in FIG. 6 by adding diode $D_c$ between the positive side of lamp L and capacitor C. For a 12-volt system, battery voltage normally will vary from about 14 to about 11 volts, a change of about 22%. However, by choosing $D_c$ at a value so that the voltage charging C is dropped by a constant value to a considerably lower voltage, the percentage variation in charging at different lamp-applied voltages can be made considerably higher, and the accuracy and number of points for plotting curve 11 can be greatly increased. For example, with $D_c$ chosen at 10 volts the charging voltage will vary from 4 volts (14−10) to one volt (11−10), or a variation of 400%, thus expanding the range over which line 14 will be crossed. In this case, the actual charging voltages E in FIG. 4 would be 10 volts less.

A less preferred form of the measuring means is illustrated in FIG. 7. Rather than using lamp voltage to charge capacitor C, a photoelectric device, such as a photoresistive element P, is placed in proximity to lamp L so that a voltage signal is generated in response to the emitted light from the lamp. The voltage signal is then used to charge capacitor C. Photoresistive device P is connected between a source of regulated voltage and capacitor C so that only changes in the resistance of the device due to perceived light will change the voltage charging capacitor C. The values of R, C, and D can be chosen in the manner described above for the expected voltage variation at capacitor C for a given lamp-lens combination and photosensitive device used.

Although this embodiment is less preferred in that it requires care in the mounting and shielding of device P, it has the advantage that darkening of the lamp envelope which occurs with age, and lessens the lamp output, and the difference in light output of different lamps are compensated for since the actual light emitted is used to generate the control signal.

From the foregoing it will be seen that this invention is one well adapted to attain all of the ends and objects hereinabove set forth, together with other advantages which are obvious and which are inherent to the method and apparatus.

As many possible embodiments may be made of the invention without departing from the scope thereof, it is to be understood that all matter herein set forth or shown in the accompanying drawings is to be interpreted as illustrative and not in a limiting sense.

The invention having been described, what is claimed is:

1. Apparatus for controlling the energy supplied from a battery to operate a flashing light source used as a navigational aid, wherein said apparatus maintains the time-intensity function of the emitted light at a value such that a substantially constant effective intensity is maintained despite variations in battery output voltage over a period of time, comprising, in combination: switch means electrically connected to the light source and to said battery; timing signal means to periodically energize said switch means to turn said light source on according to a predetermined flash cycle, means measuring energy utilized in operating the light source during each cycle and generating a cut-off signal upon the measured energy equalling substantially that required to cause light at said time-intensity function value to be emitted, said measuring means responding to the voltage applied to operate said light source and the time said voltage is applied to said light source during each flash cycle so that for different values of said applied voltage said time is varied to thereby shut off the light source during each cycle when the time-intensity function value to be maintained is reached; latching means connected to said switch means for deenergizing said switch means for the duration of the flash cycle upon receipt of said cut-off signal at any time during said cycle; and means coupling said measuring means to said latching means to apply said cut-off signal thereto.

2. The apparatus of claim 1 wherein said measuring means includes a resistance-capacitance (RC) circuit connected across the light source so that the capacitor is charged by at least a portion of the voltage applied to operate the light source.

3. The apparatus of claim 2 wherein said measuring means further includes a Zener diode having a predetermined breakdown voltage connected between said R-C circuit and said latching means.

4. The apparatus of claim 3 wherein said latching means includes a SCR connected at its gate electrode to said Zener diode.

5. The apparatus of claim 3 further including a second Zener diode connected between said light source and said R-C circuit.

6. The apparatus of claim 1, wherein said measuring means includes means generating a voltage signal in response to light emitted from said source, and a resistance-capacitance circuit connected to said generating means so that the capacitor is charged with said voltage signal.

7. The apparatus of claim 6 wherein said measuring means further includes a Zener diode having a predetermined breakdown voltage connected between said R-C circuit and said latching means.

8. The apparatus of claim 7, wherein said generating means is a photoelectric device.

9. The apparatus of claim 1 wherein said timing signal means is a timer producing start and stop timing pulse at predetermined intervals, said start pulses being produced at times corresponding to the start of each flash cycle, and a stop pulse being produced each time after said start pulses corresponding to the maximum duration of each flash cycle, said switching means connected to said timer and said measuring means, and connecting the light source to said battery in response to said start pulse and operable in response to one of said stop pulse or said cut-off pulse to disconnect the light source from said battery to turn it off.

10. The apparatus of claim 9, wherein said measuring means includes a resistance-capacitance circuit connected to the light source so that the capacitor is charged by at least a portion of the voltage applied to operate the light source.

11. The apparatus of claim 10, wherein said measuring means further includes a Zener diode having a predetermined breakdown voltage connected between said R-C circuit and said latching means.

12. The apparatus of claim 11 further including a second Zener diode connected between said light source and said R-C circuit.

13. The apparatus of claim 11, wherein said latching means includes an SCR connected at its gate electrode to said Zener diode.

14. The apparatus of claim 9, including a plurality of said switching, measuring, and coupling means responsive to start and stop pulses from said timer to operate a plurality of light sources, and further including means connected between said timer and each of said switching means to electrically isolate the inputs of said switching means from each other.

15. A method of controlling the energy supplied from a voltage source to energize a flashing light source, while maintaining the time-intensity function of the emitted light at a value such that a substantially constant effective intensity is maintained despite variations in said source voltage over a period of time, comprising the steps of periodically connecting the light source to the voltage source to turn the light source on according to a predetermined flash cycle; generating a cut-off signal during each flash cycle in response to said voltage and the time it is applied to the light source so that the energy utilized during each flash cycle to operate the light source equals substantially that required to cause light at said time-intensity function to be emitted; disconnecting the light source from the voltage source upon generation of said cut-off signal at any time during each flash cycle, to deenergize the light source; and maintaining said light source deenergized during the duration of each flash cycle.

16. The method of claim 15, further including the step of storing at least a portion of the voltage used to operate said light source until said stored voltage reaches a predetermined constant value.

17. The method of claim 15, further including the steps of generating a voltage in response to light emitted from said source, and storing said voltage until it reaches a predetermined constant value.

References Cited

UNITED STATES PATENTS

| | | | |
|---|---|---|---|
| 3,056,332 | 10/1962 | Beregowitz | 315—151 |
| 3,144,586 | 8/1964 | Gambale | 307—318 |
| 3,253,186 | 5/1966 | Rogers et al. | 315—200 |

FOREIGN PATENTS

| | | |
|---|---|---|
| 816,451 | 7/1959 | Great Britain. |

JERRY D. CRAIG, Primary Examiner

U.S. Cl. X.R.

315—151, 140; 307—252